US00RE36451E

United States Patent [19]

Gillespie et al.

[11] E Patent Number: Re. 36,451

[45] Reissued Date of Patent: Dec. 21, 1999

[54] TWO-STROKE INTERNAL COMBUSTION ENGINE WITH IMPROVED AIR INTAKE SYSTEM

[75] Inventors: George T. Gillespie, Littlehampton, United Kingdom; Fletcher C. Belt, Woodstock, Ill.; H. Norman Peterson, Kenosha, Wis.

[73] Assignee: Outboard Marine Corporation, Waukegan, Ill.

[21] Appl. No.: 08/644,404

[22] Filed: May 1, 1996

Related U.S. Patent Documents

Reissue of:

[64] Patent No.: 5,410,999
Issued: May 2, 1995
Appl. No.: 08/048,380
Filed: Apr. 15, 1993

U.S. Applications:

[63] Continuation-in-part of application No. 07/954,492, Sep. 30, 1992, Pat. No. 5,273,016.

[51] Int. Cl.[6] ..... F02M 35/10

[52] U.S. Cl. ..... 123/403; 123/73 A

[58] Field of Search ..... 123/403, 73 A, 123/73 R, 41.31, 59 B, 184.47, 184.51, 184.53, 184.41

[56] References Cited

U.S. PATENT DOCUMENTS

| | | | |
|---|---|---|---|
| 4,227,492 | 10/1980 | Haase | 123/73 A |
| 4,261,305 | 4/1981 | Ikoma | 123/73 A |
| 4,440,120 | 4/1984 | Butler . | |
| 4,515,115 | 5/1985 | Okubo . | |
| 4,643,138 | 2/1987 | Ruf . | |
| 4,644,911 | 2/1987 | Hidaka et al. . | |
| 4,702,202 | 10/1987 | Hensel . | |
| 4,776,313 | 10/1988 | Freismuth et al. | 123/470 |
| 4,777,913 | 10/1988 | Staerzl et al. | 123/73 A |
| 4,907,547 | 3/1990 | Daly . | |
| 5,005,532 | 4/1991 | Shillington . | |
| 5,094,194 | 3/1992 | Rush et al. . | |
| 5,103,777 | 4/1992 | Daikoku | 123/184.42 |
| 5,133,307 | 7/1992 | Kurihara . | |
| 5,136,990 | 8/1992 | Motoyama et al. | 123/73 A |
| 5,178,014 | 1/1993 | Ito et al. | 123/73 A |
| 5,207,186 | 5/1993 | Okita | 123/41.31 |
| 5,231,958 | 8/1993 | Takahashi et al. | 123/73 A |
| 5,273,016 | 12/1993 | Gillespie et al. | 123/403 |

*Primary Examiner*—Marguerite McMahon
*Attorney, Agent, or Firm*—Armstrong Teasdale LLP

[57] ABSTRACT

A two-stroke internal combustion engine comprising an engine block, a plurality of crankcases and including a mounting surface having therein a plurality of inlet openings each communicating with a respective one of the crankcases, a throttle housing defining a throttle passage and including a plenum mounting surface, a throttle valve in the throttle passage, and a plenum member which is separable from both the engine block and the throttle housing and which defines a plurality of intake passages each having an outlet end communicating with a respective one of the inlet openings and each having an inlet end communicating with the throttle passage such that the intake of the engine can be tuned solely by modifying the configuration of the plenum member.

19 Claims, 9 Drawing Sheets

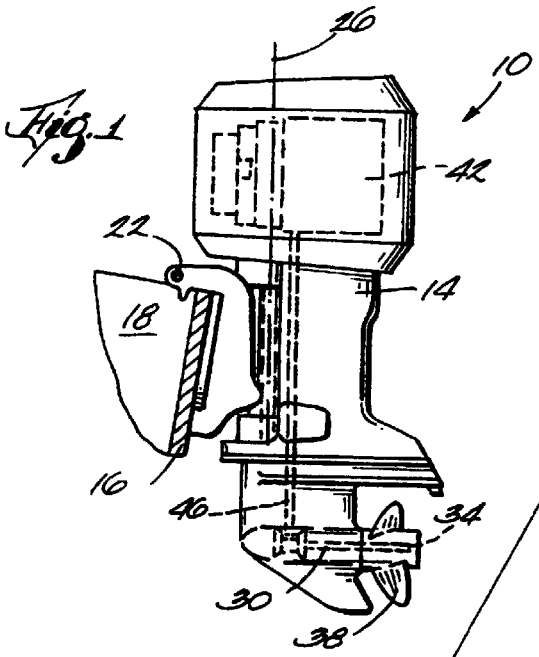
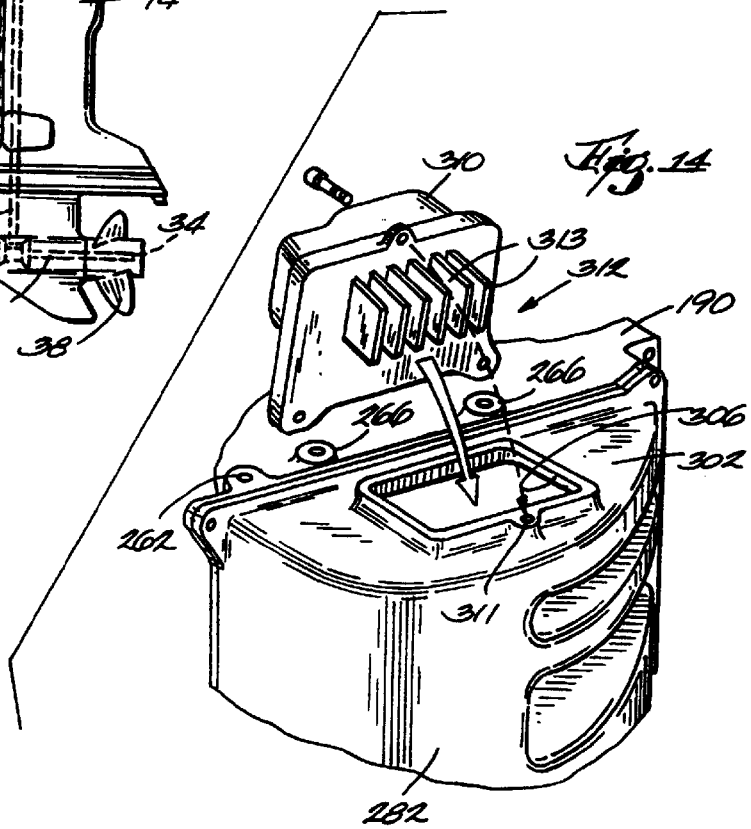
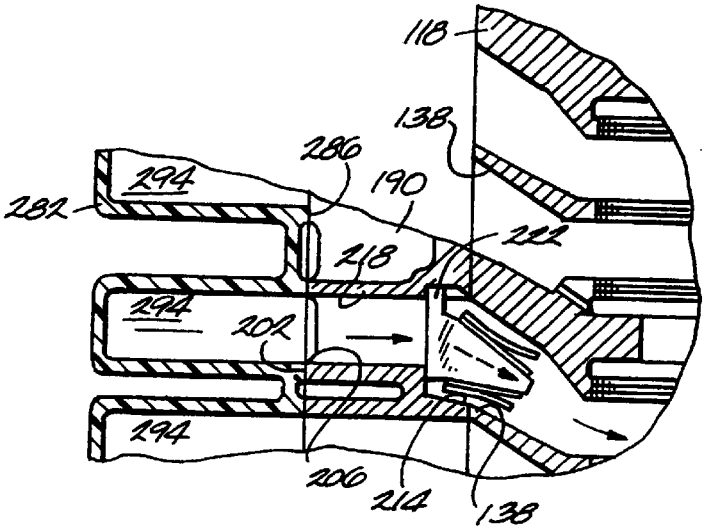
Fig. 7

TWO-STROKE INTERNAL COMBUSTION ENGINE WITH IMPROVED AIR INTAKE SYSTEM

Matter enclosed in heavy brackets [ ] appears in the original patent but forms no part of this reissue specification; matter printed in italics indicates the additions made by reissue.

RELATED APPLICATION

This is a continuation-in-part of U.S. Ser. No. 07/954,492, filed Sep. 30, 1992, now U.S. Pat. No. 5,273,016 (Atty. Docket No. 72012/1040).

BACKGROUND OF THE INVENTION

The invention relates to internal combustion engines, and more particularly to intake systems for two-stroke engines. Still more particularly, the invention relates to air intake systems for two-stroke engines in which fuel is injected directly into the cylinders.

SUMMARY OF THE INVENTION

The invention provides a two-stroke internal combustion engine comprising a cylinder block including a generally planar crankcase mounting surface having therein a crankcase recess, a crankcase cover including a generally planar cylinder block mounting surface mating with the crankcase mounting surface and having therein a crankcase recess aligned with the crankcase recess in the cylinder block and defining therewith a crankcase, and air intake means for supplying a flow of air to the crankcase, the air intake means defining a U-shaped air intake path having a downstream leg directed toward and generally perpendicular to the crankcase mounting surface and having an upstream leg generally parallel to and directed opposite the downstream leg.

The invention also provides a two-stroke internal combustion engine comprising engine block means defining a crankcase and including an intake manifold mounting surface having therein an inlet opening communicating with the crankcase, an intake manifold having a crankcase cover mounting surface mating with the intake manifold mounting surface, a plenum mounting surface opposed to the crankcase cover mounting surface, and an intake passage extending from the plenum mounting surface to the crankcase cover mounting surface, and a plenum cover including an inner surface mating with the plenum mounting surface, the plenum cover cooperating with the intake manifold to define, between the plenum cover and the intake manifold, an intake runner passage communicating with the intake passage and extending laterally from the intake passage.

The invention also provides a two-stroke internal combustion engine comprising a cylinder block including a generally planar crankcase mounting surface having therein a crankcase recess, a crankcase cover including a generally planar cylinder block mounting surface mating with the crankcase mounting surface and having therein a crankcase recess aligned with the crankcase recess in the cylinder block to define a crankcase, air intake means for supplying air to the crankcase, the intake means including a wall partially defining an air passageway communicating with the crankcase, the wall having therein an opening communicating with the passageway, and an electronic control unit mounted on the wall and overlying the opening.

The invention also provides a two-stroke internal combustion engine comprising an engine block means defining a crankcase and including an intake manifold mounting surface having therein an inlet opening communicating with the crankcase, an intake manifold including a crankcase cover mounting surface mating with the intake manifold mounting surface, a plenum mounting surface opposed to the crankcase cover mounting surface, an intake passage extending from the plenum mounting surface to the crankcase cover mounting surface and communicating with the inlet opening, and a throttle passage extending from the plenum mounting surface and parallel to the intake passage, the throttle passage being laterally offset from the intake manifold mounting surface, and means for conducting air from the throttle passage to the intake passage.

The invention also provides an outboard motor having forward and rearward ends and comprising a propulsion unit adapted to be mounted on the transom of a boat, the propulsion unit including a propeller shaft with a rearward end adapted to have mounted thereon a propeller, and the propulsion unit also including a two-stroke internal combustion engine drivingly connected to the propeller shaft, the engine including engine block means defining a crankcase and air intake means for supplying air to the crankcase, the air intake means defining a U-shaped air intake path having a rearwardly directed downstream leg and having a forwardly directed upstream leg generally parallel to the downstream leg.

The invention also provides a two-stroke internal combustion engine comprising engine block means defining a plurality of crankcases and including a mounting surface having therein a plurality of inlet openings each communicating with a respective one of the crankcases, a throttle housing defining a throttle passage and including a plenum mounting surface, a throttle valve in the throttle passage, and a plenum member which is separable from both the engine block means and the throttle housing and which defines a plurality of intake passages each having an outlet end communicating with a respective one of the inlet openings and each having an inlet end communicating with the throttle passage such that the intake of the engine can be tuned solely by modifying the configuration of the plenum member.

One of the features of the invention is the provision of an outboard motor including a two-stroke engine having relatively few parts. This simplifies the manufacture and assembly of the engine. The engine also has a tuned air intake and is configured to fit within existing outboard motor cowlings.

Another feature of the invention is the provision of a two-stroke engine having an air intake that can be tuned for optimum performance over a range of engine speeds. The range of engine speeds for which the engine is tuned can be easily changed by modifying the configuration of a single engine component.

Another feature of the invention is the provision of a two-stroke engine having an air intake and an electronic control unit that is supported by the air intake. The electronic control unit is cooled by air flowing through the air intake. The provision of an air-cooled electronic control unit eliminates the need for a water jacket for cooling the electronic control unit.

Other features and advantages of the invention will become apparent to those skilled in the art upon review of the following detailed description, claims and drawings.

DESCRIPTION OF THE DRAWINGS

FIG. 1 is a left side elevational view of an outboard motor embodying the invention.

FIG. 7 is a partial cross-sectional view of the engine taken along line 7—7 in FIG. 4.

FIG. 14 is an exploded, perspective view of a portion of the engine shown in FIG. 2.

Figure 2:
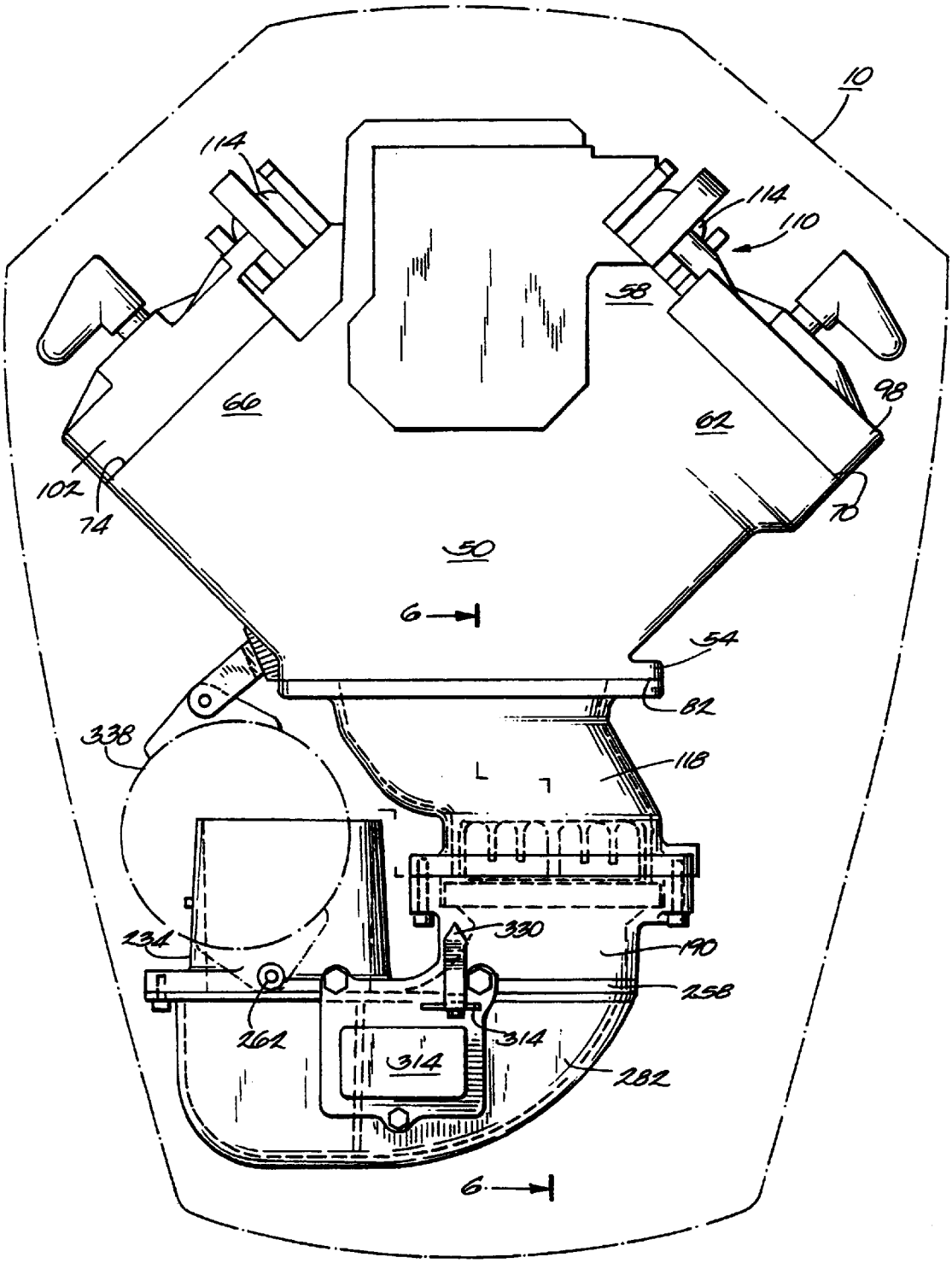
FIG. 2 is a top view of the engine that is illustrated by FIG. 1 and that is a first alternative embodiment of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An outboard motor 10 that is a first embodiment of the invention is illustrated in FIGS. 1–14. As shown in FIG. 1, the outboard motor 10 includes a propulsion unit 14 mounted on the transom 16 of a boat 18 for pivotal movement relative thereto about a generally horizontal tilt axis 22 and about a generally vertical steering axis 26. The propulsion unit 14 includes a propeller shaft 30 having a rearward end 34 having mounted thereon a propeller 38, and an internal combustion engine 42 drivingly connected to the propeller shaft 30 via a conventional drive train 46.

The internal combustion engine 42 is preferably a two-stroke, V-6 engine. The engine 42 comprises (FIGS. 2 and 5) a V-type cylinder block 50 having forward and rearward ends 54, 58. The rearward end 58 includes first and second or port and starboard cylinder banks 62, 66 having respective port and starboard cylinder head mounting surfaces 70, 74. Each cylinder bank 62, 66 includes (FIG. 4) three vertically aligned cylinders 78 (only one of which is shown). The forward end 54 of the cylinder block 50 defines (FIGS. 5 and 12) a forwardly facing, generally planar crankcase mounting surface 82 having therein (FIG. 12) six crankcase recesses 86. Each of the crankcase recesses 86 communicates with a respective one of the cylinders 78 via (FIG. 4) one or more transfer passages 90, as is known in the art. Such a cylinder block construction is conventional and will not be described in greater detail.

The engine 42 also comprises six pistons 94 (only one shown in FIG. 4) slidably housed in respective cylinders 78, three of the pistons 94 being housed by cylinders 78 in the starboard cylinder bank 66 and three pistons 94 being housed in the port cylinder bank 62.

The engine 42 also comprises (FIGS. 2 and 5) first and second or port and starboard cylinder heads 98, 102 respectively mounted on the port and starboard cylinder head mounting surfaces 70, 74 of the cylinder block 50. The starboard cylinder head 102 closes the three starboard cylinders 78 and thus cooperates with the cylinder block 50 and with the pistons 94 housed in the starboard cylinders 78 to define (FIG. 4) three combustion chambers 106 (only one shown). Similarly, though not shown in the drawings, the port cylinder head 98 closes the port cylinders 78 and thus cooperates with the cylinder block 50 and with the pistons 94 housed in the port cylinders 78 to define three combustion chambers 106. Each combustion chamber 106 communicates with a respective one of the crankcase recesses 86 in the forward end 54 of the cylinder block 50 via a respective one of the transfer passages 90.

The engine 42 also comprises (FIGS. 2 and 5) means 110 for injecting fuel directly into each of the combustion chambers 106 during engine operation. While various suitable direct fuel injecting means 110 can be employed, in the illustrated embodiment, the engine 42 includes three fuel injectors 114 which are supported by the port cylinder head 98 (one shown in FIGS. 2 and 5), and three fuel injectors 114 which are supported by the starboard cylinder head 102 (one shown in FIGS. 2 and 5). Each fuel injector 114 is operable for injecting fuel directly into a respective one of the combustion chambers 106 (shown in FIG. 4). Suitable means (not shown) are provided for supplying fuel under pressure to the fuel injectors 114.

Figure 6:
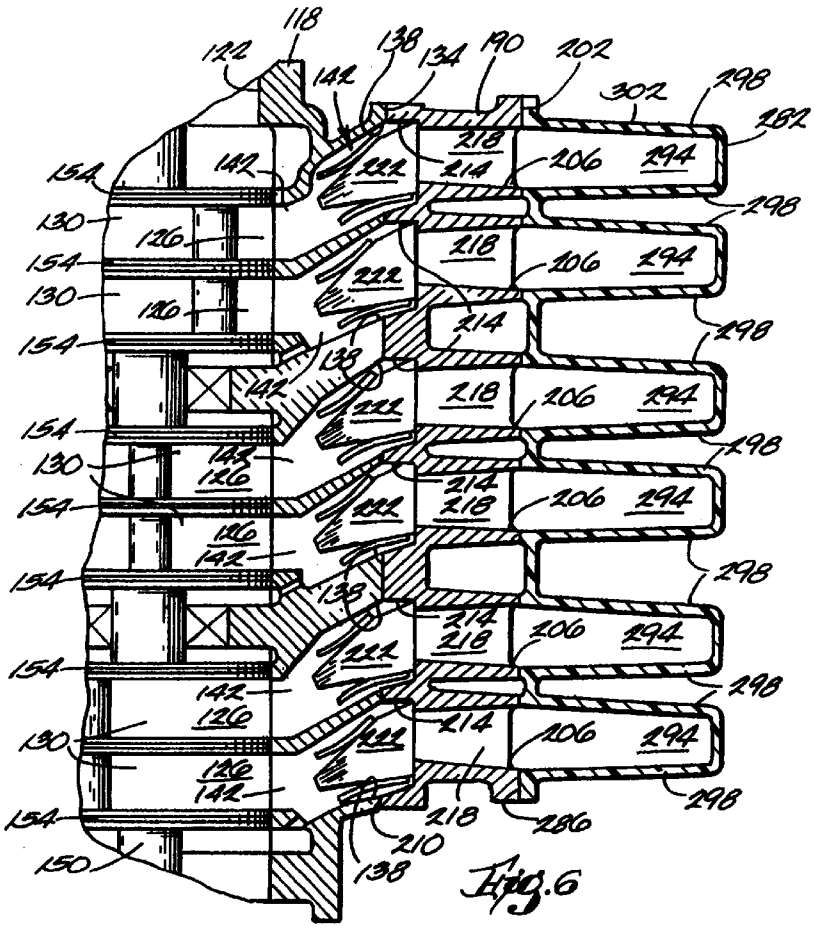
FIG. 6 is a cross-sectional view taken along line 6—6 in FIG. 2.
Figure 4:
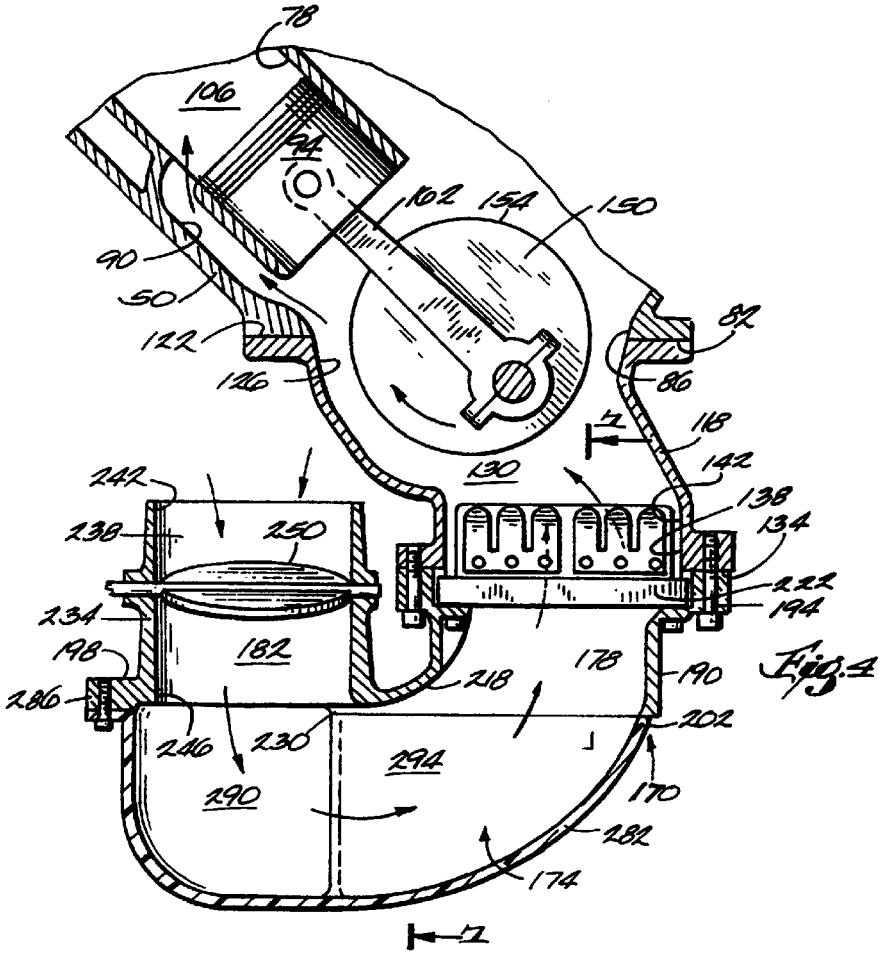
FIG. 4 is a cross-sectional view taken along line 4—4 in FIG. 3.
Figure 5:
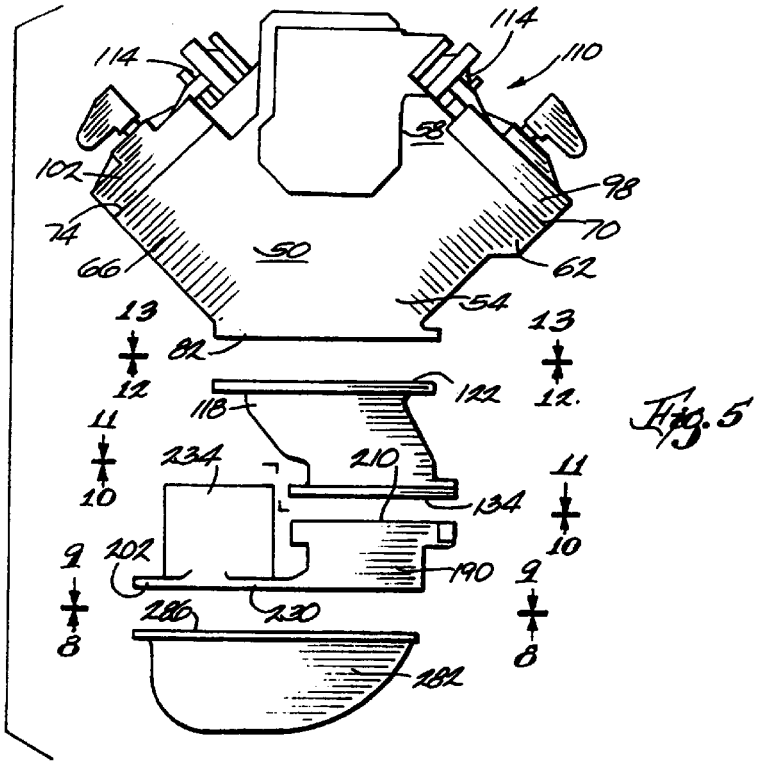
FIG. 5 is an exploded top view of the engine shown in FIG. 2.

The engine 42 also comprises (FIGS. 2, 5, 6, 10 and 13) a crankcase cover 118 mounted on the forward end 54 of the cylinder block 50. The crankcase cover 118 includes (FIGS. 4, 5 and 13) a rearwardly facing, generally planar cylinder block mounting surface 122 mating with the crankcase mounting surface 82 so that the cylinder block mounting surface 122 and the crankcase mounting surface 82 lie in a substantially vertical plane. The cylinder block mounting surface 122 has therein (FIGS. 6 and 13) six rearwardly opening crankcase recesses 126. Each of the crankcase recesses 126 aligns with a respective one of the crankcase recesses 86 in the cylinder block 50 to define therewith a crankcase 130 (FIGS. 4 and 6).

Figure 10:
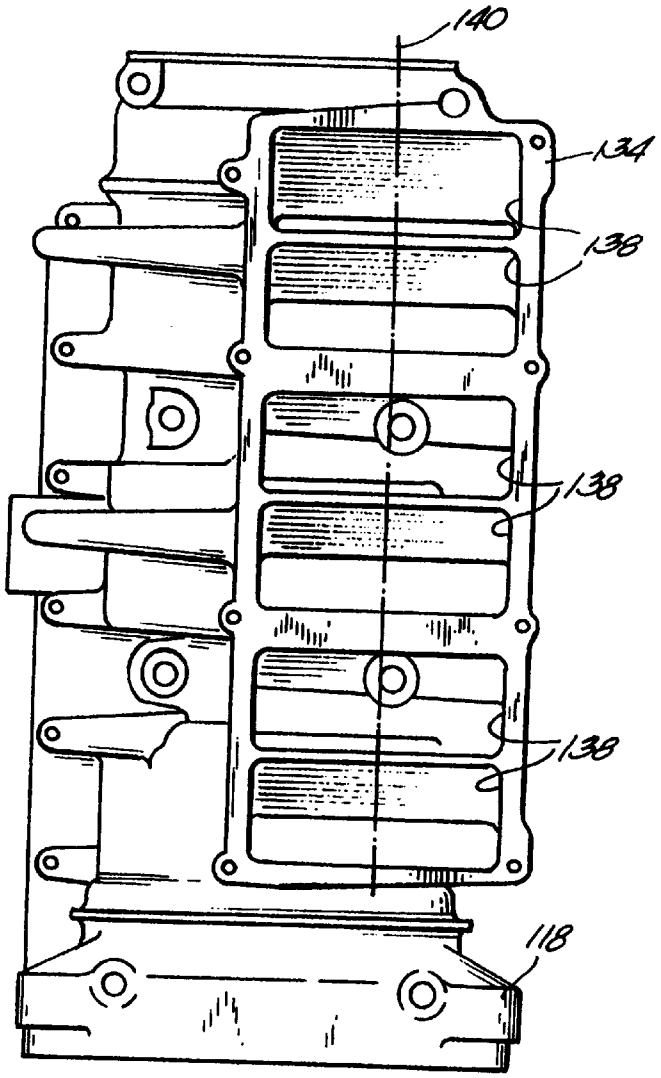
FIG. 10 is a view taken along line 10—10 in FIG. 5.
Figure 11:
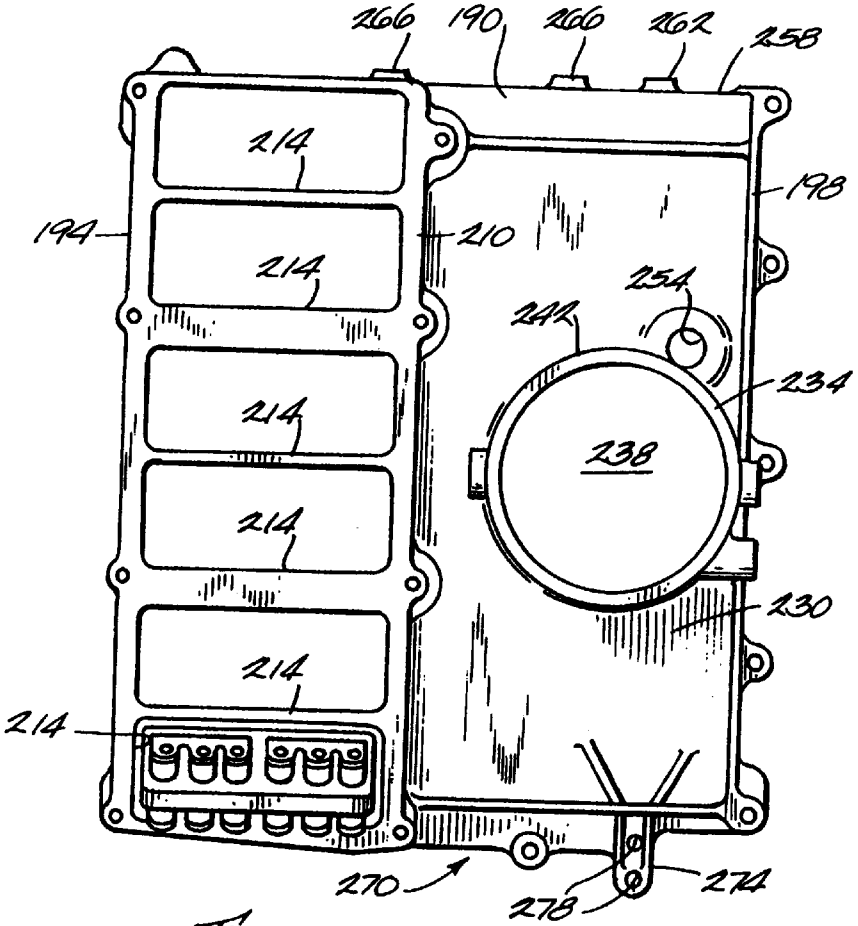
FIG. 11 is a view taken along line 11—11 in FIG. 5.
Figure 12:
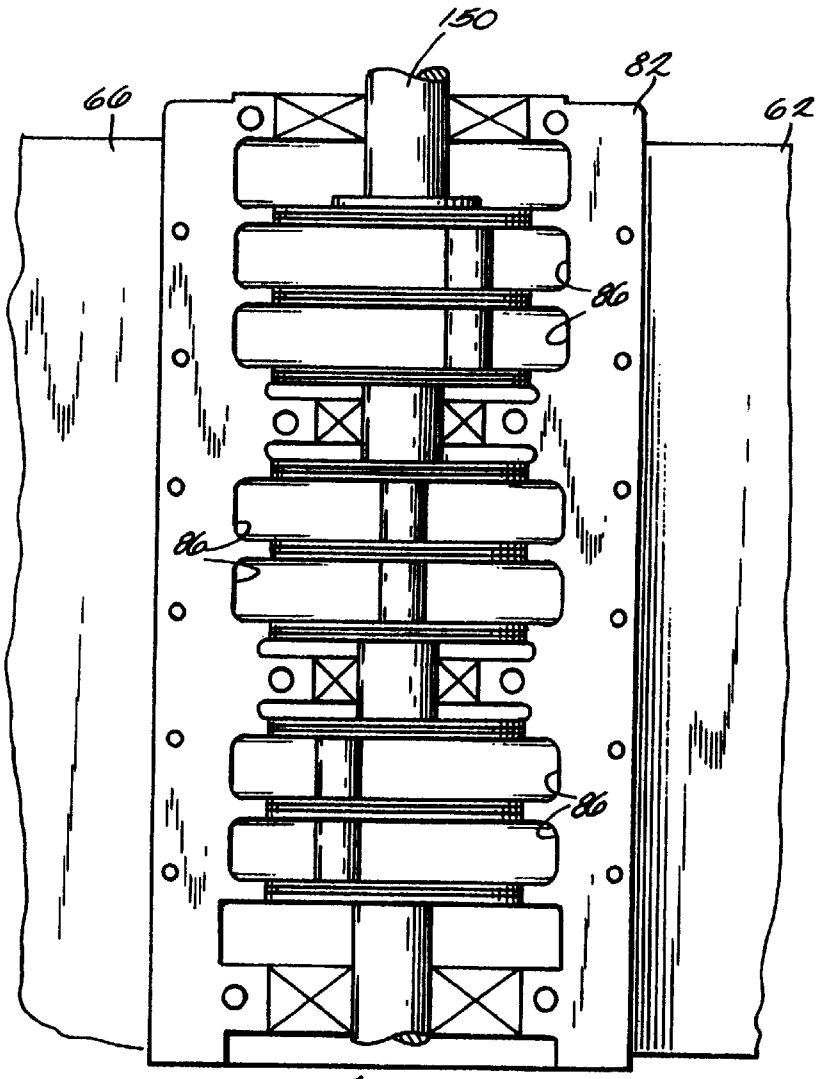
FIG. 12 is a view taken along line 12—12 in FIG. 5.
Figure 13:
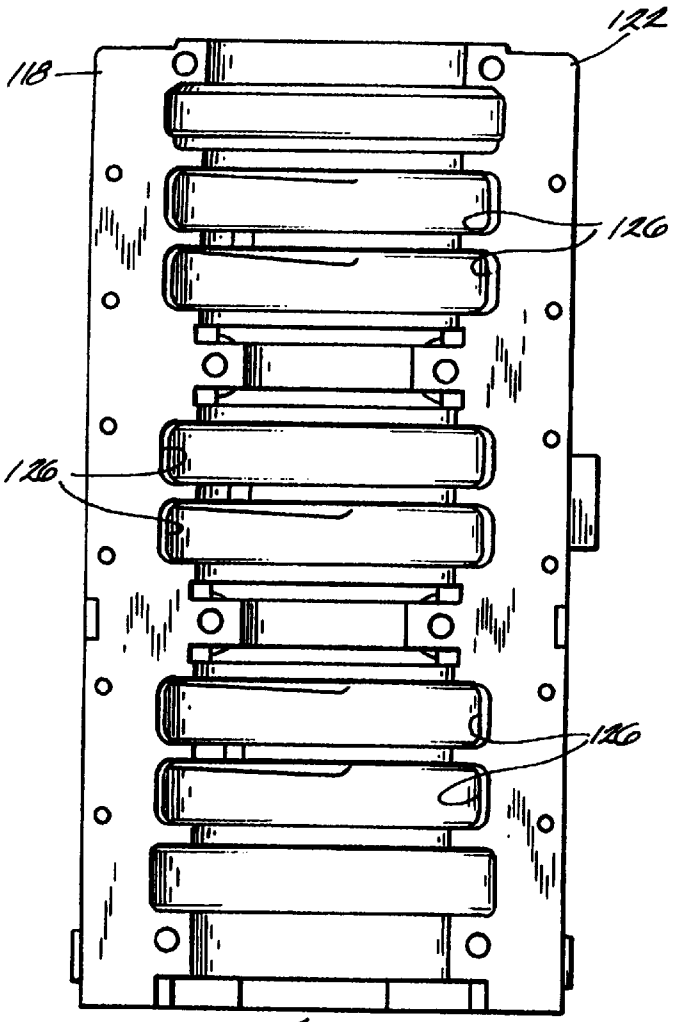
FIG. 13 is a view taken along line 13—13 in FIG. 5.

The crankcase cover 118 also includes (FIGS. 5, 6 and 10) a generally planar intake manifold mounting surface 134 facing forwardly or opposite the cylinder block mounting surface 122. The intake manifold mounting surface 134 has therein (see FIG. 10) six vertically aligned crankcase inlet openings 138. In other words, all of the inlet openings 138 are in-line, i.e., are centered on a single vertical line 140 (FIG. 10). As shown in FIG. 6, each of the crankcase inlet openings 138 communicates with a respective crankcase 130 by means of a crankcase cover passage portion 142 extending between the crankcase inlet opening 138 and a respective crankcase recess 126 in the crankcase cover 118. Any suitable means (not shown) can be employed for securing the crankcase cover 118 to the cylinder block 50.

The engine 42 also comprises (FIGS. 4 and 6) a crankshaft 150 supported by the cylinder block 50 and the crankcase cover 118 for rotation about a vertical axis lying the in the plane defined by the crankcase mounting surface 82 and cylinder block mounting surface 122. As is known in the art, the crankshaft 150 includes (see FIG. 6) disc-like portions 154 separating the adjacent crankcases 130. As is known in the art, the crankshaft 150 is connected to each of the pistons 94 by a respective piston rod 162 (one shown in FIG. 4).

It should be understood that the cylinder block 50 and the crankcase cover 118 can be considered to be a single engine block means supporting the crankshaft 150 and defining the crankcases 130.

The engine 42 also comprises air intake means 170 for supplying air to each of the crankcases 130. While various suitable constructions for the air intake means 170 can be used, in the illustrated embodiment, the air intake means 170 defines (see FIG. 4) a U-shaped air intake path 174 having a downstream leg 178 directed rearwardly or toward and generally perpendicular to the crankcase mounting surface 82 and an upstream leg 182 extending generally parallel to and directed forwardly or opposite the downstream leg 178.

More particularly, and as shown in FIGS. 4, 5, 8 and 11, the air intake means 170 includes an intake manifold 190 mounted on the forward end of the crankcase cover 118. The intake manifold 190 includes integrally cast port and starboard portions 194, 198. The port and starboard portions 194, 198 both include (FIG. 8) a forwardly facing, generally planar plenum mounting surface 202. The plenum mounting surface 202 has therein a series of six in-line, vertically aligned intake manifold inlets 206 located in the forward face of the port portion 194.

The port portion 194 also includes (FIGS. 5 and 11) a rearwardly facing, generally planar crankcase cover mounting surface 210 that mates with the intake manifold mounting surface 134. The crankcase cover mounting surface 210 extends generally parallel to the plenum mounting surface 202 and has therein a series of six in-line, vertically aligned intake manifold outlets 214. As shown in FIGS. 6 and 7, each of the intake manifold outlets 214 aligns and communicates with a respective one of the inlet openings 138 in the crankcase cover 118. As shown in FIGS. 4 and 6, an intake passage 218 extends between each of the intake manifold inlets and outlets 206, 214.

The air intake means 170 also includes (FIG. 6) six reed boxes 222 supported by the intake manifold 190 in the intake passages 218. As shown in FIG. 4, each reed box 222 is fixed to the port portion 194 of the air intake manifold 190 and (FIGS. 6 and 7) extends rearwardly from a respective intake manifold outlet 214 through a crankcase cover inlet opening 138 and into an associated crankcase passage portion 142. The reed boxes 222 operate conventionally to afford passage of intake air into the crankcases 130 from the intake manifold 190 and to prevent air flow out of the crankcases 130.

The starboard portion 198 of the intake manifold 190 includes (FIGS. 5, 8 and 11) a generally vertically extending wall or web 230. The starboard portion 198 also includes (FIGS. 4 and 11) a generally tubular throttle housing 234 extending rearwardly from the web 230. As best shown in FIG. 4, the throttle housing 234 is laterally offset (toward starboard) from the intake manifold mounting surface 134 of the crankcase cover 118. The throttle housing 234 partially defines a throttle passage 238 extending through the web 230 between a rearwardly opening inlet end 242 and a forwardly opening outlet end 246 adjacent the plenum mounting surface 202. A throttle plate 250 (FIGS. 3 and 4) is supported within the throttle passage 238 for pivotal movement about a generally horizontal axis. The starboard portion 198 of the intake manifold 190 also includes (FIGS. 8 and 11) an idle air passage 254 adjacent the throttle housing 234. The idle air passage 254 extends through the starboard portion web 230 to afford air flow into the engine 42 when the throttle passage 238 is closed by the throttle plate 250 during engine idling.

As shown in FIG. 2, the intake manifold 190 has an upper surface 258 extending laterally across the starboard and port portions 198, 194. For reasons discussed below, the upper surface 258 has thereon (FIGS. 8 and 11) adjacent its most starboard end an alternator mounting boss 262. Located toward port from the alternator mounting boss 262 is a pair of spaced-apart electronic control unit mounting bosses 266.

The starboard portion 198 of the intake manifold 190 also includes (FIGS. 8 and 11) a lower portion 270 having extending vertically downwardly therefrom a throttle cable mount 274. For reasons discussed below, the throttle cable mount 274 has therethrough a pair of bolt holes 278.

The air intake means 170 also includes (FIGS. 2–6 and 9) a plenum cover 282 mounted on the intake manifold 190. The plenum cover 282 is preferably made of plastic and includes (FIG. 9) a rearwardly facing intake manifold mounting surface 286 mating with the plenum mounting surface 202 of the intake manifold 190. As best shown in FIG. 4, the plenum cover 282 cooperates with the intake manifold 190 to define therebetween a common intake chamber 290 located forwardly of the starboard portion 198 of the intake manifold 190. The intake chamber 290 extends substantially the entire vertical extent of the plenum cover 282 and communicates with the outlet end 246 of the throttle passage 238 and with the idle air passage 254.

Figure 9:
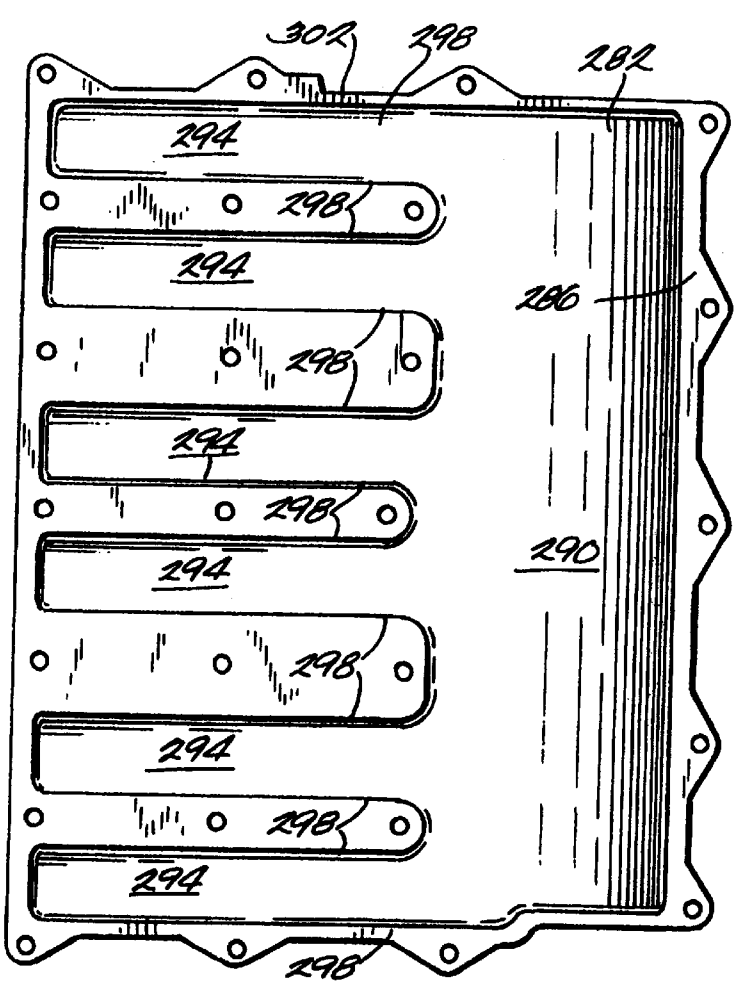
FIG. 9 is a view taken along line 9=9 in FIG. 5.
Figure 8:
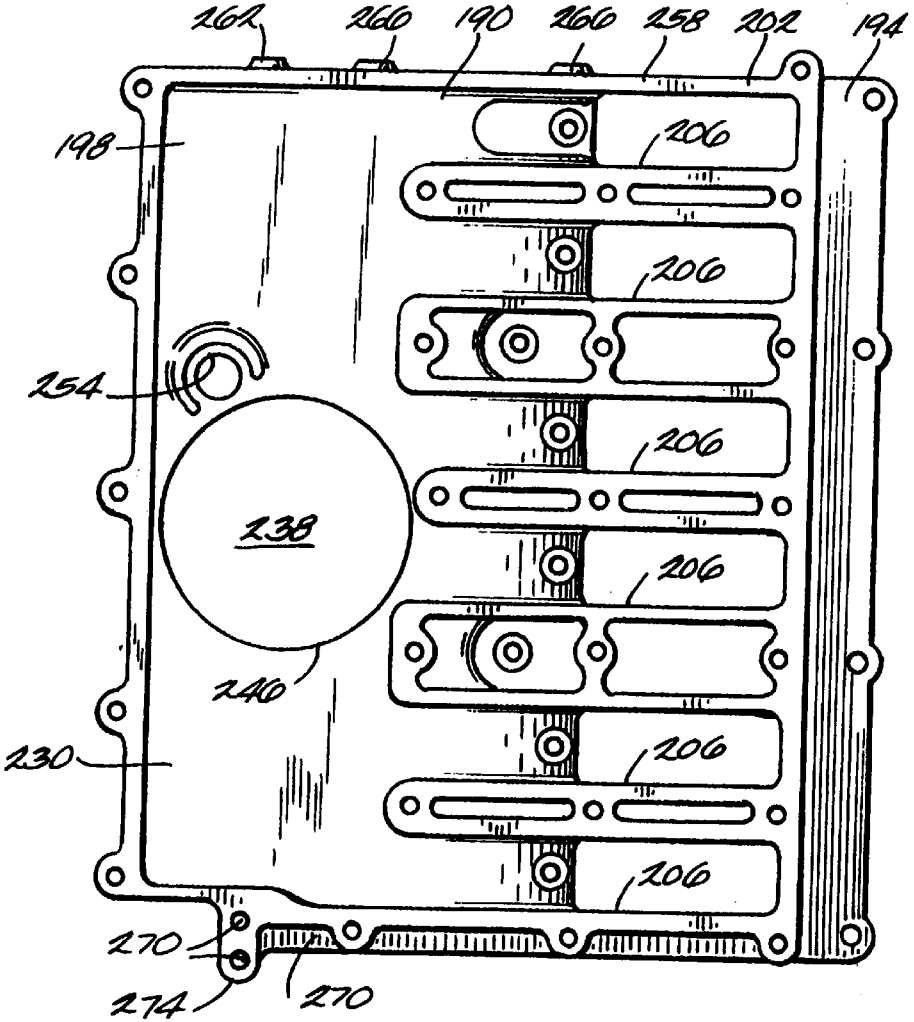
FIG. 8 is a view taken along line 8—8 in FIG. 5.

As best shown in FIGS. 6 and 9, the plenum cover 282 also cooperates with the intake manifold 190 to define six intake runner passages 294 located forwardly of the port portion 194 of the intake manifold 190. More particularly, the plenum cover 282 includes six pairs of vertically spaced-apart, opposed walls 298 that extend generally rearwardly from the forward end of the plenum cover 282. Each pair of walls 298 defines therebetween a respective runner passage 294 such that the runner passage 294 extends laterally and generally horizontally between the intake chamber 290 and a respective one of the intake manifold inlets 206. Preferably, the runner passages 294 are substantially equal in height and length, and extend uniformly between the intake chamber 290 and the intake manifold inlets 206.

As best shown in FIGS. 6 and 14, the uppermost of the walls 298 defines a top wall 302 that extends horizontally and is substantially flush to the respective upper surfaces of the intake manifold 190 and the crankcase cover 118. For reasons discussed below, the top wall 302 has therein (see FIG. 14) an opening 306 communicating with the intake chamber 290 and with the uppermost runner passage 294.

As mentioned above, and as best shown in FIG. 4, the air intake means 170, including the plenum cover 282 and intake manifold 190, provides a U-shaped path 174 for providing a flow of intake air to the crankcases 130. More particularly, air flowing into the engine 42 flows forwardly through the throttle and idle air passages 238, 254, forwardly and through the intake chamber 290, rearwardly and through the runner passages 294, and rearwardly through the intake passages 218 and the reed boxes 222. Air flowing rearwardly through the reed boxes 222 passes into the associated crankcase passages 142, and into the crankcases 130. From the crankcases 130, air flows through the transfer passages 90 to the combustion chambers 106. As shown in FIG. 4, at least one of the runner passages 294 lies in a horizontal plane including the throttle passage 254 such that the U-shaped path 174 lies in a horizontal plane. Also, each of the runner passages 294 extends horizontally from the common intake chamber 290 which is part of the upstream leg 182 of the air flow path 174. Accordingly, each of the runner passages 294 defines a horizontal plane in which portions of the upstream and downstream legs 182, 178 lie.

The air intake means 170 can be tuned to optimize the rate of mass air flow to the crankcases 130 for a particular range of engine speeds. Because the runner passages 294 and intake chamber 290 have respective configurations defined in part by the inner surface of the plenum cover 282, which is preferably made of plastic, the configuration of the runner passages 294 and the intake chamber 290 can be readily modified to tune the air intake means for various ranges of engine speeds by modifying a single component of the engine, i.e. by modifying the configuration of the plenum cover 282.

Figure 3:
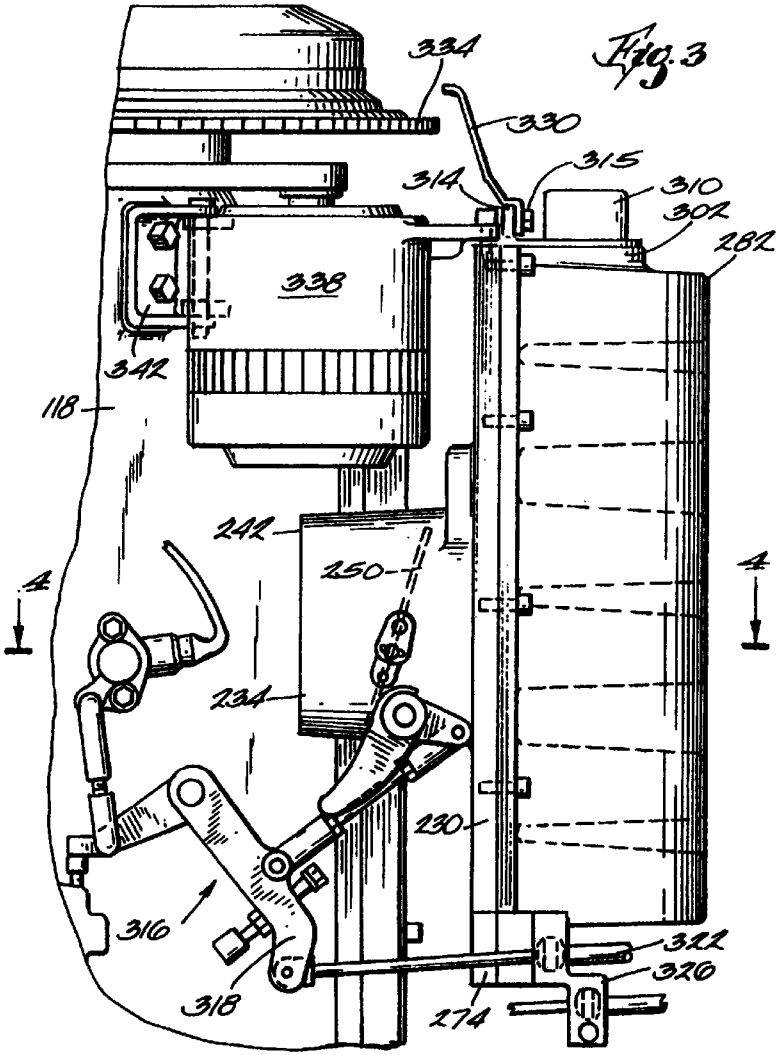
FIG. 3 is an enlarged right side elevational view of a portion of the engine shown in FIG. 1.

The engine 42 also comprises (FIG. 14) an electronic control unit 310 mounted on the top wall 302 of the plenum cover 282 and on the upper surface 258 of the intake manifold 190 in a position overlying and closing the opening 306 in the top wall 302 of the plenum cover 282. The electronic control unit 310 is fastened to the electronic control unit mounting bosses 266 and to a mounting boss 311 (FIG. 14) in the top wall 302 of the plenum cover 282. In order to protect the electronic control unit 310 from heat developed primarily by the electronic control unit 310 itself, the engine 42 also includes means 312 for cooling the electronic control unit 310. While various suitable constructions for the cooling means 312 can be used, in the illustrated embodiment, the cooling means 312 includes, on the electronic control unit 310, a plurality of cooling fins 313 extending through the opening 306 in the top wall 302 and into the intake chamber 290 and the uppermost runner passage 294. Intake air flowing into the intake chamber 290 passes the cooling fins 313 and acts as a heat sink. For reasons discussed below, the electronic control unit 310 also includes (FIGS. 2 and 3) a vertically extending timing pointer mount 314 located adjacent the interface of the plenum cover 282 and the intake manifold 190. While not shown, the timing pointer mount 314 has therethrough a laterally extending slot adapted to receive a timing pointer mounting bolt 315 (FIG. 3).

The engine 42 also comprises (FIG. 3) means 316 supported by the intake manifold 190 for controlling air flow to the engine 42 in response to operator input. While various suitable air flow controlling means 316 can be employed, in the illustrated embodiment, such means includes the above-described throttle plate 250, and a throttle linkage 318 supported by the intake manifold 190 and operably connected to the throttle plate 250. A suitable arrangement for the throttle linkage 318 is described in greater detail in the above-mentioned U.S. Ser. No. 07/954,492, which was filed Sep. 30, 1992, which is assigned to the assignee hereof, and which is incorporated herein by reference. A throttle control cable 322 for transmitting operator input is operably connected to the throttle linkage 318 and is supported by a throttle and shift cable mounting assembly 326 fixed by bolts (not shown) extending through the holes 278 in the throttle cable mount 274. A suitable throttle and shift cable mounting assembly 326 is described in greater detail in U.S. Pat. No. 5,080,618 which issued Jan. 14, 1992 and which is incorporated herein by reference.

The engine 42 further comprises (FIG. 3) a timing pointer 330 fixed by the timing pointer mounting bolt 315 along the slot in the timing pointer mount 314. The timing pointer 330 is thus indirectly supported by the plenum cover 282 and by the intake manifold 190. The engine also comprises a flywheel 334, and the timing pointer 330 is used in conjunction with markings on the flywheel 334 to determine the spark timing of the engine 42.

The engine 42 further comprises an alternator 338 (shown in FIG. 3 and in phantom in FIG. 2) mounted on the intake manifold 190 and on the cylinder block 50. The alternator 338 is mounted, in part, on the alternator mounting boss 262 and on a clevis-like fixture 342 (FIG. 3) bolted to the forward end 54 of the cylinder block 50. When so mounted, the alternator 338 extends generally vertically and is located above the throttle housing 234 and starboard of the crankcase cover 118.

One of the advantages of the engine 42 is that it includes relatively few components, thereby simplifying its manufacture and assembly. The engine 42 is further simplified by the mounting of several engine components both directly and indirectly on a single supporting component, i.e., the intake manifold 190, which also reduces the number of engine parts that are required.

Another advantage of the engine 42 is that the air intake provides an air intake flow path that, by virtue of its relatively smooth and simple configuration, provides increased efficiency in supplying air to the crankcases 130. In addition, the air intake of the engine 42 can be easily tuned for a variety of engine speeds yet can also be sized to fit within the envelope dictated by conventional engine cowls.

Another advantage of the engine 42 is the provision of an air-cooled electronic control unit 312 mounted on the air intake manifold 190. The provision of an air-cooled electronic control unit eliminates the need for a water jacket surrounding and cooling the electronic control unit, and eliminates the need for a coolant line connected to such a water jacket.

Figure 15:
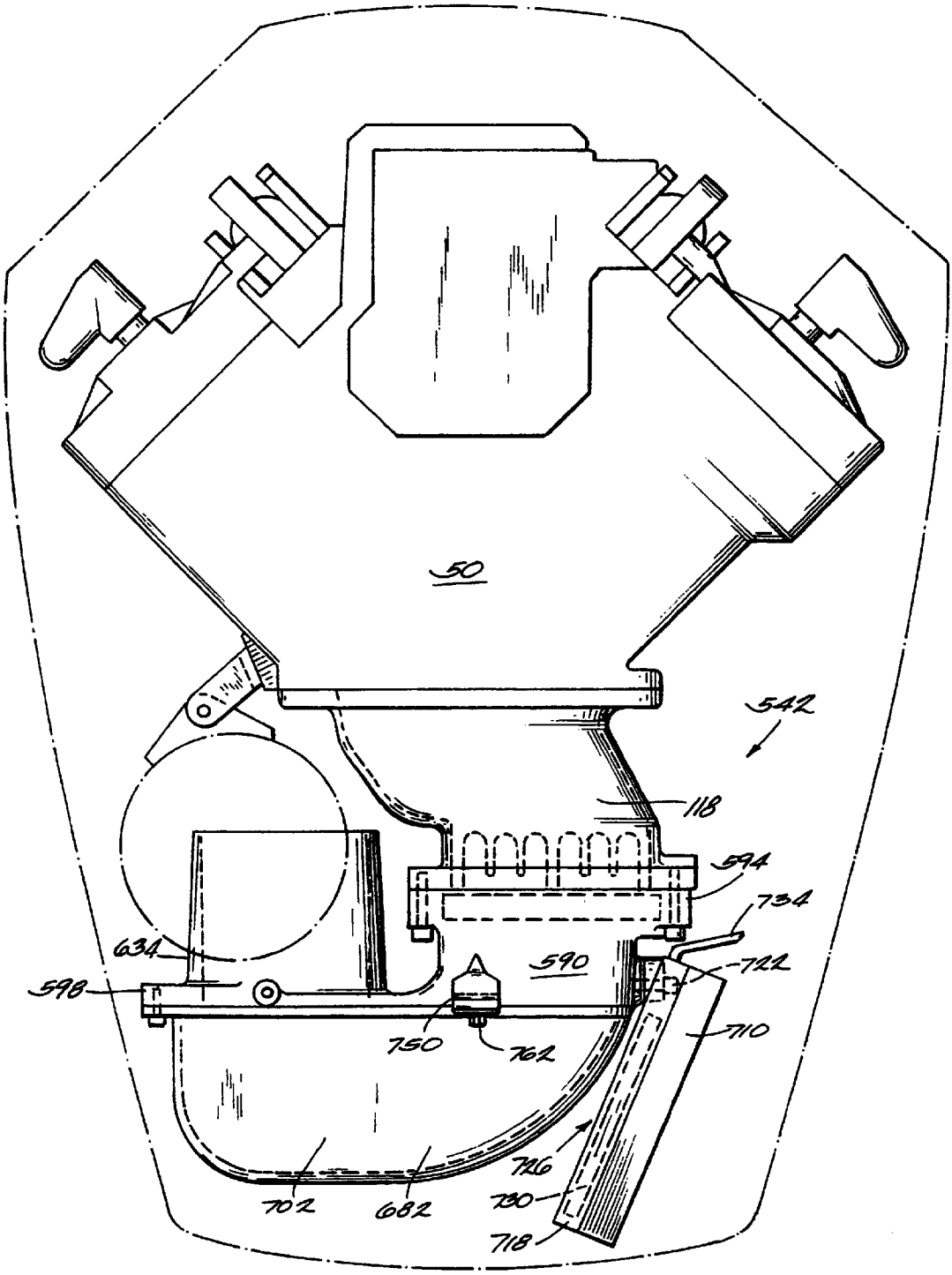
FIG. 15 is a view similar to FIG. 2 illustrating an engine that is an alternative embodiment of the invention.
Figure 16:
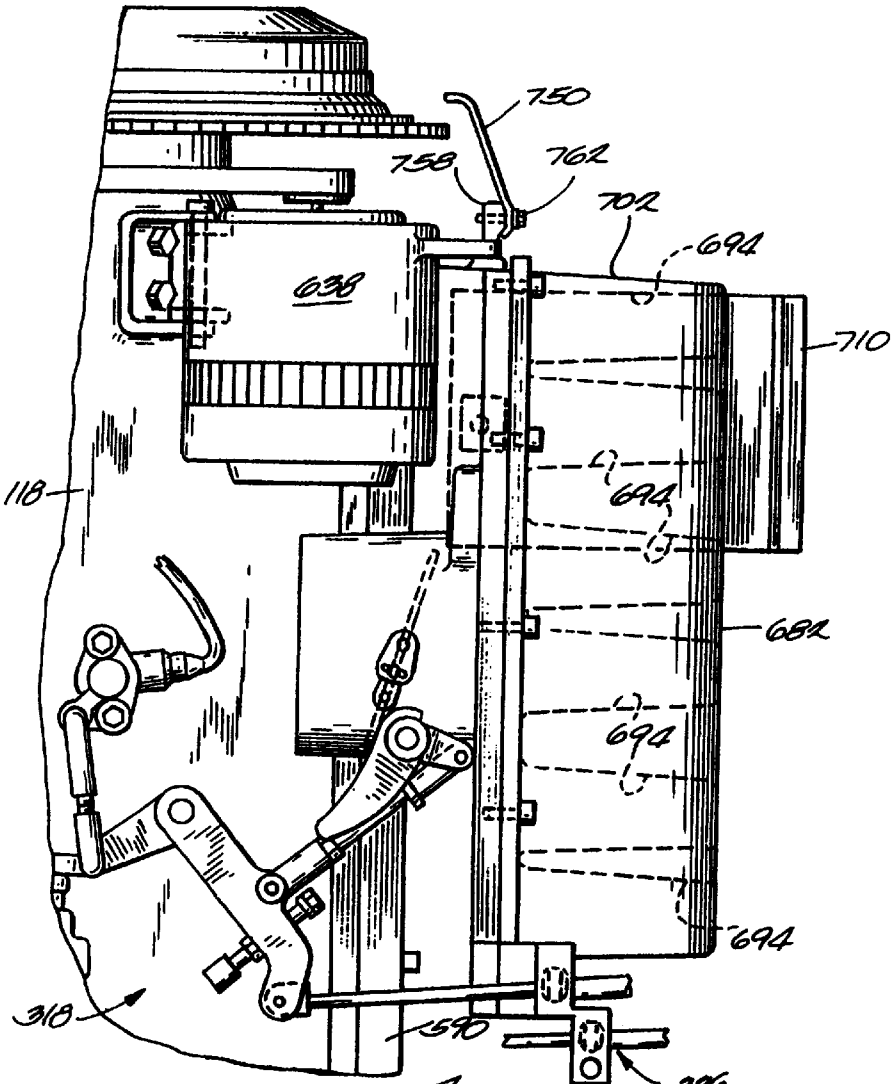
FIG. 16 is a view similar to FIG. 3 illustrating the engine shown in FIG. 15.
Figure 17:
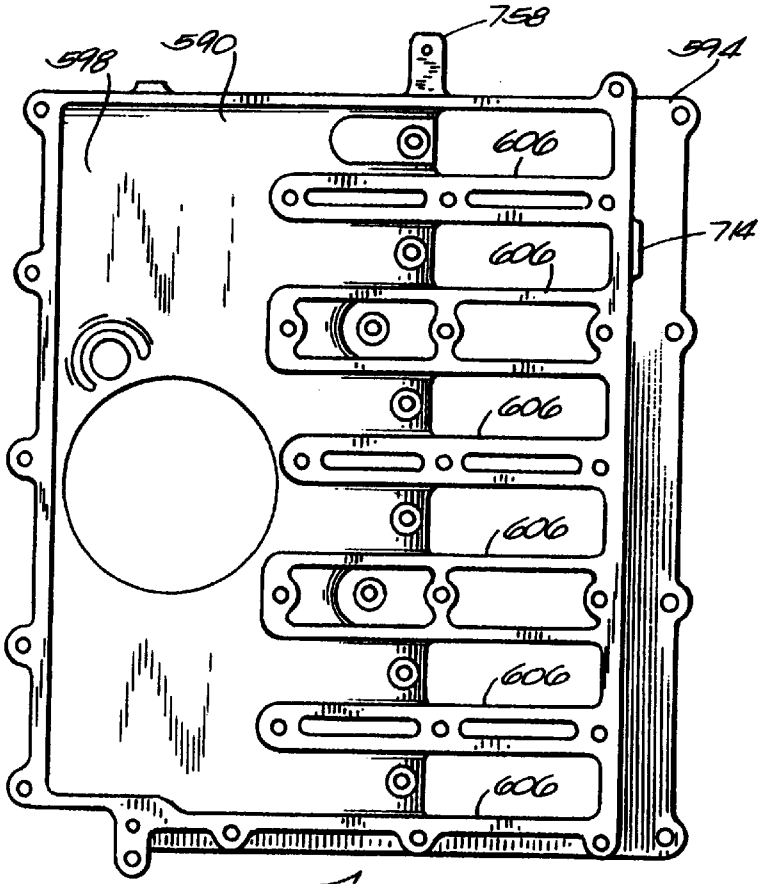
FIG. 17 is a view similar to FIG. 8 illustrating a portion of the engine shown in FIG. 15.

FIGS. 15–17 illustrate an engine 542 that is an alternative embodiment of the invention. The engine 542 is identical in construction to the engine 42 except for the below described differences. Accordingly, common reference numerals are used to identify features that are common to the engines 42 and 542.

The engine 542 includes a cylinder block 50 and a crankcase cover 118 fixed to the cylinder block 50. The cylinder block 50 and the crankcase cover 118 define therebetween a plurality of crankcases and support a crankshaft (the crankcases and crankshaft are not shown in FIGS. 15–17). The engine 542 also includes an intake manifold 590 that is mounted on the forward end of the crankcase cover 118. The intake manifold 590 includes integrally cast port and starboard portions 594, 598 and (see FIG. 17) a plurality of intake manifold inlets 606 located in the port portion 594.

The engine 542 also includes (see FIGS. 15 and 16) a plenum cover 682 mounted on the forward end of the intake manifold 590. The plenum cover 682 is made of plastic and provides an inner surface that cooperates with the intake manifold 590 to define therebetween a common intake chamber (not shown) located forwardly of the intake manifold 590 and a plurality of intake runner passages 694 that each extend from the common intake chamber and a respective one of the intake manifold inlets 606. As best shown in FIGS. 15 and 16, and unlike the top wall 302 of the plenum cover 282, the uppermost or top wall 702 of the plenum cover 682 provides an imperforate surface, i.e. the wall 702 does not have therein any openings or other means providing access to the interior of the plenum cover 682.

The engine 542 also includes (FIGS. 15 and 17) an electronic control unit 710 mounted on the port portion 594 of the intake manifold 590. More particularly, and as best shown in FIG. 17, the port portion 594 of the intake manifold 590 includes a mounting boss 714 that faces laterally outwardly. The electronic control unit 710 includes (see FIG. 15) a base 718 that is fixed to the mounting boss 714 by a bolt 722. The base 718 provides means 726 for cooling the electronic control unit 710. While various suitable cooling means 726 could be employed, in the illustrated embodiment, the cooling means 726 includes a water jacket 730 (shown schematically in FIG. 15) located within the base 718. The cooling means 726 also includes a pair of water hoses 734 (only one shown in FIG. 15) that are connected to a suitable source of coolant (not shown), such as a water jacket in the cylinder block, and that provide a flow of coolant to and from the water jacket 730.

The engine 542 also includes (See FIG. 16) a timing pointer 750 that is mounted directly on the intake manifold 590. In particular, and as illustrated in FIG. 16, the intake manifold 590 provides a timing pointer mount 758 extending upwardly from the upper portion of the intake manifold 590. The timing pointer 750 is fixed to the timing pointer mount 758 by suitable means such as a bolt 762.

Like the engine 42, the engine 542 also includes an alternator 638, a throttle linkage 318 and a throttle and shift cable mounting assembly 326, each of which is mounted on the intake manifold 590. While the engines 42 and 542 include respective intake manifolds 190 and 590 respectively supporting various specifically disclosed engine components, it should be readily understood that the intake manifolds 190 and 590 can be readily modified support additional various engine components. For example, the intake manifolds. 190 and 590 can be readily modified by providing appropriately located mounting bosses in a variety of positions, including on the lower portions of the intake manifolds 190 and 590, to provide support for fuel pumps and fuel flow regulators.

Various features of the invention are set forth in the following claims.

We claim:

1. A two-stroke internal combustion engine comprising a cylinder block including a generally planar crankcase mounting surface having therein a crankcase recess, a crankcase cover including a generally planar cylinder block mounting surface mating with said crankcase mounting surface and having therein a crankcase recess aligned with said crankcase recess in said cylinder block and defining therewith a crankcase, and air intake means for supplying a flow of air to said crankcase, said air intake means defining a U-shaped, *generally horizontal,* air intake path having a downstream leg directed toward and generally perpendicular to said crankcase mounting surface *and affording air flow in the rearward direction toward said crankcase* and having an upstream leg *extending* generally parallel to and directed opposite said downstream leg *and affording air flow in the forward direction.*

2. An engine as set forth in claim 1 wherein said intake path has a plurality of downstream legs.

[3. An engine as set forth in claim 1 wherein said upstream and downstream legs define a generally horizontal plane.]

4. An engine as set forth in claim 1 wherein said crankcase mounting surface and said cylinder block mounting surface lie in a generally vertically extending plane.

5. An engine as set forth in claim 1 wherein said crankcase cover includes an intake manifold mounting surface having therein an inlet opening communicating with said crankcase.

6. An engine as set forth in claim 5 wherein said air intake means includes an intake manifold including a crankcase cover mounting surface mating with said intake manifold mounting surface.

7. An engine as set forth in claim 6 wherein said intake manifold includes a plenum mounting surface opposed to said crankcase cover mounting surface and an intake passage extending from said plenum mounting surface to said crankcase cover mounting surface and communicating with said inlet opening.

8. An engine as set forth in claim 7 wherein said intake manifold includes a throttle passage extending from said plenum mounting surface parallel to said intake passage, said throttle passage being laterally offset from said intake manifold mounting surface.

9. An engine as set forth in claim 8 wherein said intake means further includes a plenum cover including an inner surface mating with said plenum mounting surface, said plenum cover cooperating with said intake manifold to define an intake chamber communicating with said throttle passage.

10. An engine as set forth in claim 9 wherein said plenum cover also cooperates with said intake manifold to define an intake runner passage communicating between said intake chamber and said intake passage.

11. A two-stroke internal combustion engine comprising an engine block defining a crankcase including an intake manifold mounting surface having therein an inlet opening communicating with said crankcase, an intake manifold having a crankcase cover mounting surface mating with said intake manifold mounting surface, a plenum mounting surface spaced from and extending in parallel relation to said crankcase cover mounting surface, and an intake passage extending from said plenum mounting surface to said inlet opening and generally perpendicularly to said plenum mounting surface, and a plenum cover including an inner surface mating with said plenum mounting surface, and an intake runner passage communicating with said intake passage and extending from said intake passage in lateral relation to said plenum mounting surface.

12. An engine as set forth in claim 11 wherein said plenum cover also cooperates with said intake manifold to define an intake chamber, and wherein said intake runner passage communicates between said intake chamber and said intake passage.

13. An engine as set forth in claim 11 wherein said engine block means includes a cylinder block including a crankcase mounting surface having therein a crankcase recess, and a crankcase cover including a cylinder block mounting surface mating with said crankcase mounting surface and having therein a crankcase recess aligned with said crankcase recess in said cylinder block to define said crankcase, and wherein said crankcase cover includes said intake manifold mounting surface.

14. An engine as set forth in claim 11 wherein said engine block means defines a plurality of crankcases, wherein said intake manifold mounting surface has therein a plurality of inlet openings each of which respectively communicates with a respective crankcase, and wherein said plenum cover and said intake manifold cooperate to define a plurality of intake runner passages each of which respectively communicates with a respective inlet opening.

15. An engine as set forth in claim 14 wherein said engine block means includes a V-type cylinder block, and wherein all of said inlet openings are in-line.

16. A two-stroke internal combustion engine comprising a cylinder block including a generally planar crankcase cover mounting surface having therein a crankcase recess, a crankcase cover including a generally planar cylinder block mounting surface mating with said crankcase cover mounting surface and having therein a crankcase recess aligned with said crankcase recess in said cylinder block to define a crankcase, air intake means for supplying air to said crankcase and including a throttle housing and a wall located intermediate said throttle housing and said crankcase and partially defining an air passageway communicating between said throttle housing and said crankcase, said wall having therein an opening communicating with said passageway, an electronic control unit mounted on said wall, and means for cooling said electronic control unit including a plurality of cooling fins extending from said electronic control unit and through said opening and into said passageway.

17. A two-stroke internal combustion engine comprising an engine block means defining a crankcase and including an intake manifold mounting surface having therein an inlet opening communicating with said crankcase, an intake manifold including a crankcase cover mounting surface mating with said intake manifold mounting surface, a plenum mounting surface opposed to said crankcase cover mounting surface, an intake passage extending from said plenum mounting surface to said crankcase cover mounting surface and communicating with said inlet opening, and a throttle passage extending from said plenum mounting surface and parallel to said intake passage, said throttle passage being laterally offset from said intake manifold mounting surface, and means for conducting air from said throttle passage to said intake passage.

18. An engine as set forth in claim 17 wherein said intake manifold supports at least one of any of an electronic control unit, a plurality of reed boxes, a throttle linkage which is connected to a throttle plate, a cable mount which supports a throttle control cable, a timing pointer, and an alternator.

19. An outboard motor having forward and rearward ends and comprising a propulsion unit adapted to be mounted on the transom of a boat, said propulsion unit including a propeller shaft with a rearward end adapted to have mounted thereon a propeller, and said propulsion unit also including a two-stroke internal combustion engine drivingly connected to said propeller shaft, said engine including engine block means defining a crankcase and air intake means for supplying air to said crankcase, said air intake means defining a U-shaped, *generally horizontal,* air intake path having a rearwardly directed downstream leg *affording air flow in the rearward direction toward said crankcase* and having a forwardly directed upstream leg *extending* generally parallel to said downstream leg *and affording air flow in the forward direction.*

20. A two-stroke internal combustion engine comprising an engine block including a cylinder block including a crankcase cover mounting surface having therein a crankcase recess, and a crankcase cover including a cylinder block mounting surface mating with said crankcase cover mounting surface and having therein a crankcase recess aligned with said crankcase recess in said cylinder block to define a plurality of crankcases, said crankcase cover also including an intake manifold mounting surface having therein a like plurality of inlet openings respectively communicating with said crankcases, a throttle housing defining a throttle passage and including a plenum mounting surface, a throttle valve in said throttle passage, an intake manifold including a crankcase cover mounting surface mating with said intake manifold mounting surface, a plenum mounting surface opposed to said crankcase cover mounting surface, and a like plurality of inlet passages respectively communicating between said plenum mounting surface and said inlet openings of said crankcase cover, and a plenum member which is mounted on said plenum mounting surfaces of said throttle housing and said intake manifold, which is separable from both said intake manifold and said throttle housing and which defines a like plurality of intake passages having respective outlet ends communicating respectively with said inlet passages of said intake manifold and having respective inlet ends communicating with said throttle passage such that the intake of said engine can be tuned solely by modifying the configuration of said plenum member.

* * * * *